US012599968B2

(12) United States Patent
Viklund et al.

(10) Patent No.: US 12,599,968 B2
(45) Date of Patent: Apr. 14, 2026

(54) METHOD OF PRODUCING AN ADDITIVE MANUFACTURED OBJECT

(71) Applicant: SANDVIK MACHINING SOLUTIONS AB, Sandviken (SE)

(72) Inventors: Per Viklund, Rengsjo (SE); Einar Ottesen, Ranheim (NO); Ralf Lehto, Sandviken (SE)

(73) Assignee: Sandvik Machining Solutions AB, Sandviken (SE)

( * ) Notice: Subject to any disclaimer, the term of this patent is extended or adjusted under 35 U.S.C. 154(b) by 335 days.

(21) Appl. No.: 17/046,330

(22) PCT Filed: Apr. 5, 2019

(86) PCT No.: PCT/EP2019/058616
§ 371 (c)(1),
(2) Date: Oct. 9, 2020

(87) PCT Pub. No.: WO2019/197281
PCT Pub. Date: Oct. 17, 2019

(65) Prior Publication Data
US 2021/0146449 A1 May 20, 2021

(30) Foreign Application Priority Data
Apr. 12, 2018 (EP) .................................... 18167033

(51) Int. Cl.
*B22F 10/66* (2021.01)
*B22F 10/47* (2021.01)
(Continued)

(52) U.S. Cl.
CPC .............. *B22F 10/66* (2021.01); *B22F 10/47* (2021.01); *B22F 12/30* (2021.01); *B22F 12/44* (2021.01);
(Continued)

(58) Field of Classification Search
CPC ......... B33Y 30/00; B33Y 10/00; B33Y 40/00; B33Y 40/20; B22F 10/00; B22F 10/60; B22F 10/66; B22F 12/00; B22F 12/30
See application file for complete search history.

(56) References Cited

U.S. PATENT DOCUMENTS

2016/0031010 A1 2/2016 O'Neill et al.
2017/0266890 A1 9/2017 Volk

FOREIGN PATENT DOCUMENTS

CN 106312066 A 1/2017
DE 29907262 U1 7/1999
(Continued)

OTHER PUBLICATIONS

Flynn et al: "Hybrid additive and subtractive machine tools-Research and industrial developments", International Journal of Machine Tools and Manufacture, Elsevier, Amsterdam, NL, vol. 101, Nov. 22, 2015, pp. 79-101.
(Continued)

*Primary Examiner* — Tabassom Tadayyon Eslami
(74) *Attorney, Agent, or Firm* — Corinne R. Gorski

(57) ABSTRACT

The present invention relates to a method for producing an object of metal, wherein the object is built with an additive manufacturing process on at least one base device having a build surface at one end. The base device is part of a base device system, which includes the base device and a supporting means holding the base device in a fixed position during the additive manufacturing process. The method includes the steps of building the object on at least a part of the base device build surface with the additive manufacturing process, removing the base device from the supporting means, connecting the base device to a CNC machine
(Continued)

provided with at least one machining tool, and separating the built object from the base device by means of a machining tool in the CNC machine.

8 Claims, 4 Drawing Sheets

(51) Int. Cl.

| | |
|---|---|
| *B22F 12/30* | (2021.01) |
| *B22F 12/44* | (2021.01) |
| *B22F 12/82* | (2021.01) |
| *B33Y 30/00* | (2015.01) |
| *B33Y 40/20* | (2020.01) |
| *B22F 10/28* | (2021.01) |
| *B33Y 10/00* | (2015.01) |

(52) U.S. Cl.
CPC .............. *B22F 12/82* (2021.01); *B33Y 30/00* (2014.12); *B33Y 40/20* (2020.01); *B22F 10/28* (2021.01); *B33Y 10/00* (2014.12)

(56) References Cited

FOREIGN PATENT DOCUMENTS

| | | | |
|---|---|---|---|
| DE | 102012011217 | A1 | 12/2013 |
| EP | 3417961 | A1 | 12/2018 |
| WO | 2017/051029 | * | 3/2017 |
| WO | 2017051029 | A1 | 3/2017 |
| WO | 2017093591 | A1 | 6/2017 |
| WO | 2017160683 | A1 | 9/2017 |
| WO | 2017222379 | A1 | 12/2017 |

OTHER PUBLICATIONS

Thompson et al: "Design for Additive Manufacturing; Trends, opportunities, considerations, and constraints", Cirp Annals, Elsevier BN, NL, CH, FR, vol. 65, No. 2, Jun. 25, 2016, pp. 737-760.

* cited by examiner

101

108

METHOD OF PRODUCING AN ADDITIVE MANUFACTURED OBJECT

RELATED APPLICATION DATA

This application is a § 371 National Stage Application of PCT International Application No. PCT/EP2019/058616 filed Apr. 5, 2019, claiming priority to EP 18167033.2 filed Apr. 12, 2018.

The present invention relates to a method of producing an additive manufactured object.

INTRODUCTION

In additive manufacturing an object is gradually built on a base plate which thus acts as a solid foundation on which the three dimensional object is built.

The additive manufactured object usually needs to be further treated and/or shaped in some subsequent operation which is normally made at some place away from the equipment where the additive manufacturing took place so the built object has to be moved from the additive manufacturing machine, usually involving removal from a base plate.

Methods of producing an object by additive manufacturing include laser powder-bed fusion and powder-bed fusion by electron beam. In the laser powder-bed fusion method solid particles are applied in a thin layers and a three dimensional object is gradually formed layer-by-layer by fusing together particles with one or more laser beams, or an electron beam, according to a specific pattern.

When making an additive manfactured object of metal by powder-bed fusion by laser or electron beam there is usually a quite strong bond formed between the built object and the base plate. Since also the base plate is normally made of metal the built object will in fact be welded to the base plate. It is common to use a single large base plate onto which several individual objects are built. After the additive manufacturing each individual object has to be manually removed from the base plate. However, this is time consuming and also requires a lot of manual work resources.

When one or more subsequent operational steps are to be used, such as shaping (machining), grinding and polishing, there may be difficult and as well time consuming to mount and adjust the additive manufactured object in a machining equipment such as an CNC (Computer Numerical Control) machine so that the accuracy of the desired shape within certain dimensional tolerances can be provided. It may also be difficult to assure repetetiveness between several additive manufactured objects in dimensional tolerances and accuracy in machining operations.

OBJECT OF THE INVENTION

Thus, there is one object of the present invention to provide a less time-consuming, less labour-requiring method for making an additive manufactured object. There is a further object of the present invention to be able to make an additive manufactured object with greater dimensional accuracy and high repetetiveness of the accuracy after post-processing machining when making several additive manufactured objects.

Definitions

By the term "metal" is herein also included alloys of different metal elements.

The Invention

The invention relates to a method for producing an object of metal wherein the object is built with an additive manufacturing process on a base device, said device having a build surface at one end, said base device being part of a base device system comprising at least one base device and a supporting means holding the base device in a fixed position during the additive manufacturing process, wherein the method comprises the steps of building the object on at least a part of the base device build surface with the additive manufacturing process, removing the base device from the supporting means, connecting the base device to a CNC machine provided with at least one machining tool and, separating the built object from the base device by means of a machining tool in the CNC machine.

In one embodiment the method comprises a step of building a layer (L) of metal on at least a part of the base device build surface in an additive manufacturing process prior to the first part of the object is built.

In one embodiment of the method, the step of separating the built object from the base device comprises removing at least a part of the layer (L) of metal on the base device.

The separation of the built object suitably comprises removing at least a part of the layer (L) of metal on the base device.

In one embodiment a part of the layer (L) of metal remains on the base device after the separation of the built object and this remaining part of the layer (L) of metal is in a subsequent step removed from the base device.

In one embodiment of the method the step of separating the built object from the base device comprises removing the whole layer (L) of metal on the base device.

In one embodiment the method comprises a step of removing a part of the base device. The removal of a part of the base device can take place in the same processing step as when separating the built object, alternatively it can take place after the step of separating the built object.

In one embodiment the layer (L) of metal is built in the additive manufacturing process prior to the object is built.

When the layer (L) of metal is built in the additive manufacturing process the material used when building the layer (L) is suitably the same metal material as the metal used when building the object. If different metal materials are used in the layer (L) of metal and the built object they need to have such compatibility that a sufficient strong bond between them is created in the additive manufacturing process. This means that the different metal materials are suitably welded to each other in the additive manufacturing process.

By separating the additive manufactured object from the base device by means of a machining tool and at the same time removing the layer (L) of metal which has been built in the additive manufacturing process the original size and shape of the base device as prior to the additive manufacturing process is re-established and the base device is ready to be used again when making a further additive manufactured object. Also, by this procedure the separation of the additive manufactured object from the base device onto which it has been built can be made directly after a post processing on the object has/have been finished while remaining in the same mounting in the CNC machine. This saves time and labour.

The separation of the object from the base device is suitably made by means of a turning tool, a milling tool, a filing tool or a sawing tool or an electrical discharge machining tool.

The layer (L) of metal is suitably removed by means of a turning tool, a milling tool, a filing tool or a sawing tool or an electrical discharge machining tool.

The method suitably comprises at least one step of post processing of the built object in the CNC machine prior to separation of the object from the base device, the post processing comprises turning, milling, drilling, blasting, grinding, finishing, coating, electrical discharge machining, cladding and measuring operations.

If desired and needed, in one embodiment the build surface of the base device is further machined, in the same CNC machine or in another machine or place, e.g., by flat grinding or other finishing, to restore it for reuse.

The base device can be connected to the CNC machine mounting the end of the base device in a CNC machine spindle, for example by clamping.

The base device is suitably connected to the CNC machine so that an axis of rotation of the base device is coinciding with an axis of rotation of the built object. This is especially important when a turning operation is used in post-processing of the built object.

The object built on the base device is suitably exactly one object. This makes the post processing steps in the CNC machine easy. The method enables an efficient handling of objects separately built on separate base devices.

In one embodiment the base device build surface has substantially the same width as the lowermost width of the object being built on it, alternatively the base device build surface has a smaller width than the lowermost width of the object being built on it. This minimizes the risk of a processing tool coming into contact with the base device during processing if the base device with the built object rotates in the CNC machine.

In one embodiment the supporting means comprises a solid plate having one or more recesses or apertures. One or more base devices can then be fitted into the recesses or apertures.

In one embodiment the supporting means comprises an open structure holder in the form of an array of bars or threads.

in the form of an open structure holder, such as an array of bars or threads, for example forming a grid structure into which the one or more base devices can be put. One or more base devices can then be fitted into the open structure holder.

In one embodiment the supporting means has a connection means adapted to be engaged with a connection means on the base device. This enables a fixed joint between the supporting means and the base device during the building of the object.

The connection means on the base device may also be used when clamping the base device in a CNC machine spindle.

In one embodiment the connection means on the base device comprises a CNC machine interface coupling, suitably a chuck or spindle interface coupling.

The machine interface coupling can be any type of machine tool interface coupling such as a Coromant Capto® toolholder, a HSK toolholder, a Steep taper toolholder, a Big Plus toolholder, or an ISO cone toolholder.

Optionally, additional fixing means such as a screw can be used for fixing the base device to the supporting means.

The base device connection means suitably further comprises alignment means for keeping the base device with the additive manufactured object in a correct centered and/or rotational position in the supporting means. The alignment means of the base device being engaged with corresponding alignment means of the supporting means. Such an alignment means on the base device or on the supporting means can be a hole, a recess or a pin, preferably a combination of these. For an alignment means on the base device being a hole it is thus intented to interact with a pin on the supporting means, and vice versa. In one embodiment a part at the center of the build surface has a slot, compatible with a tool, e.g. a screw driver, which makes alignment of the base device easier when placed in the supporting means.

The base device is suitably removable from the supporting means by lifting the base device upwards from the supporting means.

The base device system, i.e. the one or more base devices together with the supporting means, is in one embodiment removable from the additive manufacturing machine.

In one embodiment the base device is removed from the additive manufacturing machine, subsequent to the step of building the object, by removing the base device system of supporting means and at least one base device while the at least one base device still being in a fixed position within the supporting means. By this an easy way of handling and transportation of the one or more base devices from the additive manufacturing machine to the CNC machine is provided. Especially when several base devices with built objects are to be transported and the CNC machine is located far away from the additive manufacturing machine.

The supporting means can be made of any suitable material but is preferably made of metal.

In one embodiment the base device system is a combination of a holder plate as supporting means with several recesses or apertures, and base devices fitted in the recesses or apertures.

The base device may fit, in a vertical direction, into a recess or aperture of the holder plate completely or partly. If the base device is fitted partly an upper part of the base device extends above the horizontal plane of the holder plate. This arrangement may be beneficial for easy gripping the base device when removing it from or putting it into the holder plate.

The shape of at least one part of the base device to be fitted into the holder plate may be such that it fits into a specific recess or aperture of the holder plate.

In one embodiment the base device is of a cylindrical shape

The recesses or apertures of the holder plate can be of any shape such as a circular-, ellipsioidal-, triangular-, quadratical-, pentagonal-, hexagonal shape etc.

In one embodiment the base device is of a cylindrical shape with flattened portions at the end. This assists in keeping the base device firmly attached in the chuck and preventing rotational slip.

The additive manufacturing process is suitably laser powder-bed fusion or powder-bed fusion by electron beam.

Since the object being additive manufactured is made of metal or metal alloy and is made by laser powder-bed fusion, or powder-bed fusion by electron beam, of metal or metal alloy powder, at least the upper part of the base device is made of metal, alternatively the whole base device is made of metal.

The method of this invention makes the handling of additive manufactured objects easy and low in its labour demand. This is because additive manufactured objects can, first of all, be individually removed from an additive manufacturing equipment and transferred and connected to the CNC machine without any need of manually sawing off, or breaking off, the objects from a base plate. Furthermore, several operations are possible to make while the base device with the object is still connected to the CNC machine.

Further, if present, the connection means on the base device makes it fast and easy to connect the base device with the additive manufactured object to further processing equipment. Furthermore, if connection means at the end of the base device is present high accuracy is provided of the final object dimensions after various operational machining steps made on the object after the additive manufacturing since the connection means assures a precise mounting into a CNC machine with high accuracy and enables repeated operations (removal/mounting) with retained precision. Also, no time is needed for calibrating the position of the additive manufactured object before machining.

DETAILED DESCRIPTION OF EMBODIMENTS

Figure 1:
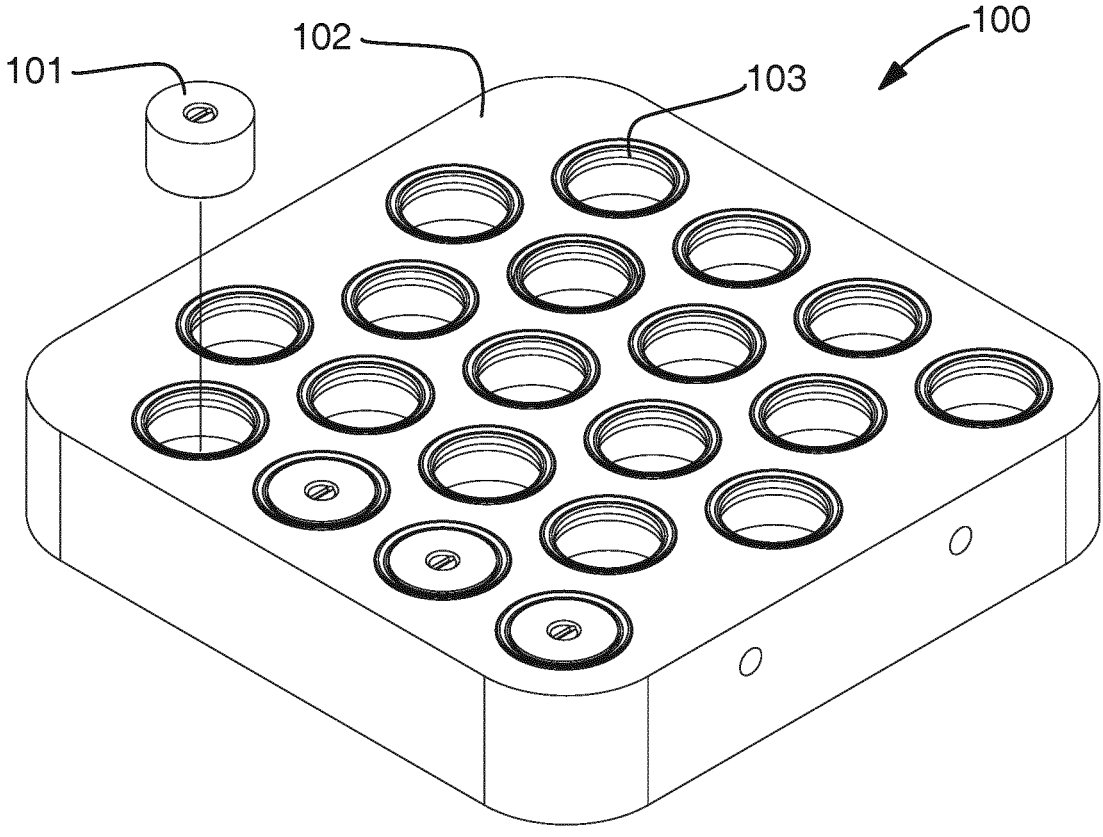
FIG. 1 schematically illustrates a base device system comprising a base device and a supporting means.

FIG. 1 schematically illustrates an embodiment of a base device system 100 comprising a base device 101 and a supporting means 102. The supporting means 102 is in this embodiment in the form of a solid plate provided with apertures 103.

Figure 2:
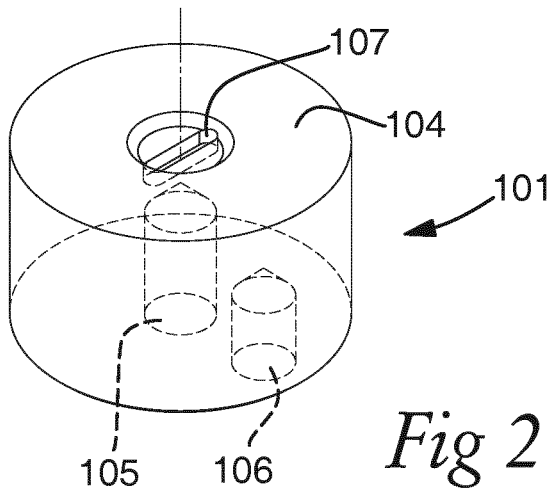
FIG. 2 shows a base device according to one embodiment wherein the base device has a generally cylindrical shape and has alignment means at its end.

FIG. 2 shows a an embodiment of a base device 101 having a build surface 104 and being of a generally cylindrical shape. The base device further has alignment means 105, 106, in the form of holes for keeping the base device 101 with an additive manufactured object in a correct centered and rotational position in the supporting means. A slot 107 is present on the upper side of the base device 101.

Figure 3:
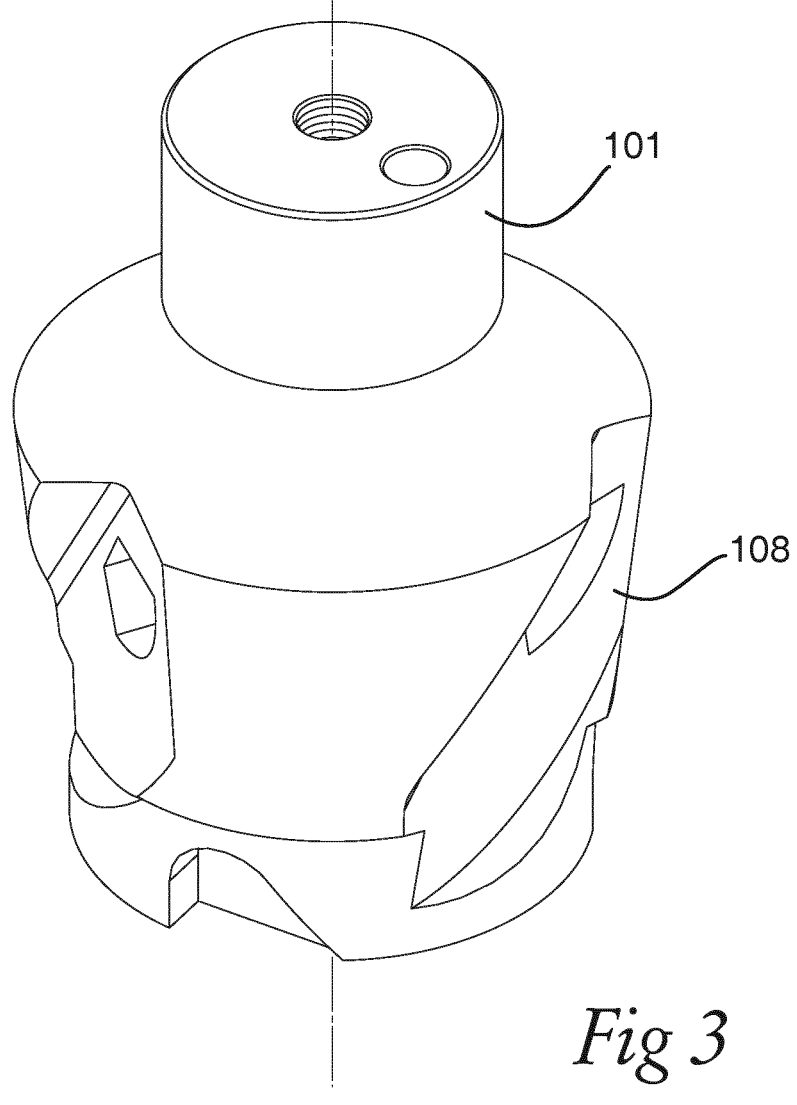
FIG. 3 shows an embodiment of a base device with an additive manufactured object built on it.

FIG. 3 shows an embodiment of a base device 101 with an additive manufactured object 108 built on it being a milling tool body prior to post-processing machining.

Figure 4:
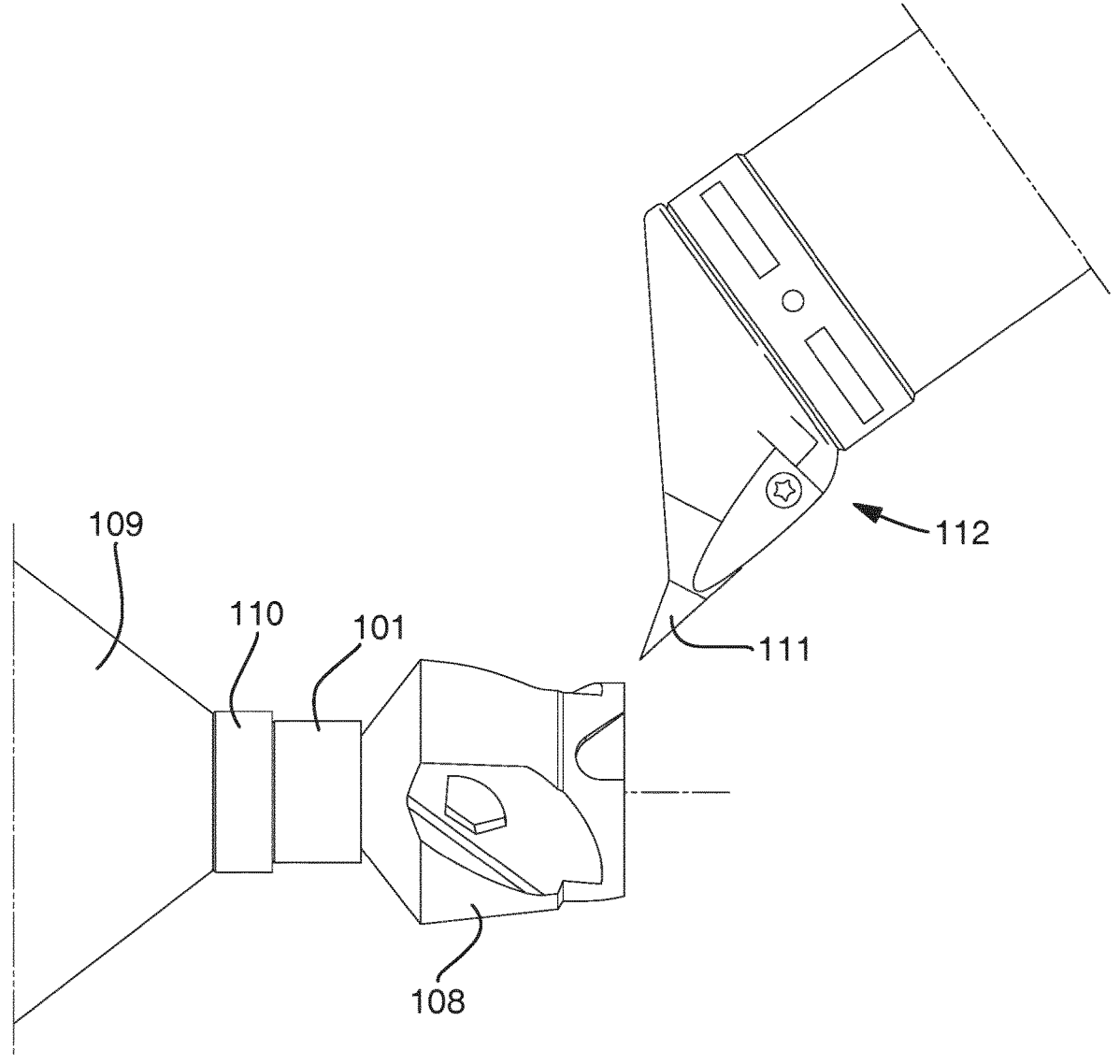
FIG. 4 shows an illustration of a base device with an additive manufactured object connected to a CNC machine for machining.

FIG. 4 shows an illustration of a base device 101 mounted in a CNC machine spindle 109 via a chuck 110. The base device 101 has an additive manufactured object 108 built on it. A machining tool 111 is mounted on a machine spindle 112 in the CNC machine.

In a preferred embodiment the method comprises providing one or more base devices 101 in the form of a substantially cylindrical metal bodies, providing a supporting means in the form of a metal base plate 102 having one or more apertures 103. The one or more base devices 101 are then each put into an aperture 103 of the base plate 102 forming a base device system 100. The base device system 100 of mounted base devices 101 in the base plate 102 is then put into an additive manufacturing machine, alternatively the base plate 102 is first inserted into the additive manufacturing machine and the base devices 101 then mounted in the base plate apertures 103. Then it is started to build a layer (L) of additive manufactured metal by laser powder-bed fusion followed by the building of the actual objects 108 by continuing using laser powder-bed fusion. When an object 108 have been built on each base device 101 the whole base device system 100 of the base plate 102 with the mounted base devices 101 is taken out from the additive manufacturing machine and transferred to the location of a CNC machine. The base devices 101 are then one after another mounted in the CNC machine spindle 109 and processed into the final desired shape and surface smoothness. When the processing is finished the object is finally separated from the base device by a machining operation where also the first layer (L) of additive manufactured metal situated under the actual object is removed.

In one embodiment the base device 101 is preferably in the form of a substantially cylindrical metal body of a total height of between 2 and 10 cm and a diameter of between 1 and 10 cm. The supporting means in the form of a metal base plate 102 suitably has from 1 to 50 apertures 103. The thickness of the base plate 102 is suitably between 1 and 10 cm, depending on the height of the base devices 101 to be combined with the base plate 102. The layer (L) of additive manufactured metal is suitably built to a height of between 1-50 mm.

In a further preferred embodiment the base devices 101 are one after each other taken out from the base plate 102 and put into the CNC machine by a robot. After processing including separation of the post-processed built object from the base plate 102 a robot is taking the object out of the CNC machine and as well the base device 101. The base device 101 is then ready for use again in an additive manufacturing process.

The invention claimed is:

1. A method for producing an object of metal, wherein one object is built with an additive manufacturing process based on laser powder-bed fusion or powder-bed fusion by electron beam on a base device having a build surface at one end, said base device being part of a base device system including at least one base device, said at least one base device or at least an upper part of said at least one base device being made of metal, and a supporting means including a solid plate having one or more recesses or apertures holding the base device in a fixed position during the additive manufacturing process, wherein the method comprises the steps of:

building the object on at least a part of the base device build surface with the additive manufacturing process;

removing the base device from the additive manufacturing machine subsequent to the step of building the object by removing the base device system of supporting means and at least one base device while the at least one base device still being in a fixed position within the supporting means;

removing the base device from the supporting means;

connecting the base device to a CNC machine provided with at least one machining tool;

post processing the built object in the CNC machine prior to separating the built object from the base device by means of a machining tool in the CNC machine;

building a layer of metal on at least a part of the base device build surface in an additive manufacturing process prior to a first part of the object being built; and at least one step of post processing of the built object in the CNC machine prior to separation of the object from the base device, the post processing including one of turning, milling, drilling, blasting, grinding, finishing, coating, electrical discharge machining, cladding and measuring operations, wherein the step of separating the built object from the base device includes removing at least a part of the layer of metal on the base device, and wherein a part of the layer of metal remains on the base device after the separation of the built object, the remaining part of the layer of metal being, in a subsequent step, removed from the base device.

2. The method according to claim 1, wherein the step of separating the built object from the base device includes removing the whole layer of metal on the base device.

3. The method according to claim 1, further comprising a step of removing a part of the base device.

4. The method according to claim 1, wherein the layer of metal is removed by means of a turning tool, a milling tool, a filing tool or a sawing tool or an electrical discharge machining tool.

5. The method according to claim 1, wherein the base device includes connection means at an end opposite to the one end having the build surface.

6. The method according to claim 5, wherein the connection means on the base device includes a CNC machine interface coupling.

7. The method according to claim 1, wherein the supporting means includes an open structure holder in a form of an array of bars or threads.

8. A method for producing an object of metal, wherein one object is built with an additive manufacturing process based on laser powder-bed fusion or powder-bed fusion by electron beam on a base device having a build surface at one end and including connection means at its end opposite to the build surface, the base device being part of a base device system including at least one base device, said at least one base device or at least an upper part of said at least one base device being made of metal and a supporting means including a solid plate having one or more recesses or apertures holding the base device in a fixed position during the additive manufacturing process, wherein the method comprises the steps of:

building the object on at least a part of the base device build surface with the additive manufacturing process;

removing the base device from the additive manufacturing machine subsequent to the step of building the object by removing the base device system of supporting means and at least one base device while the at least one base device still being in a fixed position within the supporting means;

removing the base device from the supporting means;

connecting the base device to a CNC machine provided with at least one machining tool, i) wherein the base device is clamped in a CNC machine spindle by means of a connection means or ii) via a CNC machine interface coupling in a connection means;

post processing the built object in the CNC machine prior to separating the built object from the base device by means of a machining tool in the CNC machine while remaining in a same mounting in the CNC machine; and building a layer of metal on at least a part of the base device build surface in the additive manufacturing process prior to the first part of the object is built, the layer of metal being of a same metal material as the object of metal, wherein the step of separating the built object from the base device includes removing at least a part of the layer of metal on the base device, and wherein a part of the layer of metal remains on the base device after the separation of the built object, the remaining part of the layer of metal being, in a subsequent step, removed from the base device.

* * * * *